US009118723B1

(12) United States Patent  
Su et al.

(10) Patent No.: US 9,118,723 B1
(45) Date of Patent: Aug. 25, 2015

(54) POST AND CONTENT FRAMEWORK FOR SOCIAL ACTIVITY STREAMS

(71) Applicant: Google Inc., Mountain View, CA (US)

(72) Inventors: Ray J. Su, Sunnyvale, CA (US); Brynn Marie Evans, San Francisco, CA (US); Christopher Templin Howse, Mountain View, CA (US)

(73) Assignee: Google Inc., Mountain View, CA (US)

( * ) Notice: Subject to any disclaimer, the term of this patent is extended or adjusted under 35 U.S.C. 154(b) by 240 days.

(21) Appl. No.: 13/857,843

(22) Filed: Apr. 5, 2013

Related U.S. Application Data

(60) Provisional application No. 61/620,926, filed on Apr. 5, 2012, provisional application No. 61/620,948, filed on Apr. 5, 2012.

(51) Int. Cl.
*G06F 13/00* (2006.01)
*G06F 15/00* (2006.01)
*H04L 29/08* (2006.01)

(52) U.S. Cl.
CPC ............... *H04L 67/22* (2013.01); *G06F 15/00* (2013.01)

(58) Field of Classification Search
CPC ................................ H04L 67/22; G06F 15/00
USPC ......... 715/715, 738, 763–765, 851–853, 753, 715/777, 740, 780, 716
See application file for complete search history.

(56) References Cited

U.S. PATENT DOCUMENTS

| 2011/0154223 A1* | 6/2011 | Whitnah et al. ............... 715/753 |
| 2014/0122584 A1* | 5/2014 | Gargi et al. .................... 709/204 |

* cited by examiner

*Primary Examiner* — Kevin Nguyen
(74) *Attorney, Agent, or Firm* — McDermott Will & Emery LLP

(57) ABSTRACT

Computer-implemented methods for generating and providing a post in a social activity stream by using a post framework and a content framework are provided. The post framework provides clear separation of shared content, the posting user's voice, social metadata, comment discussion, and interactive actions. The content framework includes a defined content body. The content body may include content, metadata and user interface control elements to be provided in a user post within a social activity stream. Systems and machine-readable media for providing a post in a social activity stream by using a post framework and/or a content framework are also provided.

26 Claims, 12 Drawing Sheets

US 9,118,723 B1

POST AND CONTENT FRAMEWORK FOR SOCIAL ACTIVITY STREAMS

CROSS-REFERENCE TO RELATED APPLICATIONS

The present application claims the benefit of priority under 35 U.S.C. §119 from U.S. Provisional Patent Application Ser. No. 61/620,926, filed on Apr. 5, 2012, and U.S. Provisional Patent Application Ser. No. 61/620,948, filed on Apr. 5, 2012, the disclosures of which are hereby incorporated by reference in their entirety for all purposes.

BACKGROUND

The present disclosure generally relates to social activity streams, and more particularly to post frameworks and content frameworks for providing a post and content in a social activity stream.

Social network applications allow content provided by social network application providers, third party providers (e.g., publishers, companies, brands), and posting users to be shared between users in social activity streams. A user generates a post to the social activity stream that may include such shareable content. However, the shared content may be short, summarized or static, which may render it uninteresting to a user consuming the shared content. Also, the shared content may be mixed with social metadata and social comments, making it difficult to distinguish between what is written by a user and the content that is being shared. Scaling social stream applications may be difficult and the content being shared may be missed or lost in the shuffle from the consuming user's point of view.

SUMMARY

According to one embodiment of the disclosure, a computer implemented method for providing a social activity stream post framework is provided. The method includes using a processor to generate a post framework having a head portion, a body portion and a waist portion. The method also includes arranging identifying information of a posting user in the head portion. The method further includes arranging content in the body portion. The method also includes arranging a social network control element in the waist portion. The method further includes providing the post framework for display in the social activity stream on a client device. Other embodiments include corresponding systems, apparatus, and computer program products.

These and other embodiments may include one or more of the following features. The post framework further includes a leg portion and arranging a user comment in the leg portion. The post framework further includes an accessory portion and arranging context information of the content in the accessory portion. Arranging a user interface control element in the post framework in which the user interface control element is configured to reveal concealed metadata about the post framework when a cursor is hovered over the user interface control element. Revealing concealed metadata providing information related to the post framework when a cursor is hovered over any portion of the post framework. Arranging a user interface control element in the post framework in which the user interface control element is configured to start an action related to the post framework when the user interface control element is selected. The user interface control element having a transparent overlay that is displayed as an opaque button when a cursor is hovered over the transparent overlay.

These and other embodiments may also include one or more of the following features. Creating a defined container area within the body portion and arranging third party content in the defined container. The post framework is arranged in a common form for each of a plurality of social activity stream post types. The post framework is configured to collapse to hide the body portion in response to a user action. The post framework is configured to expand to display more of the body portion in response to a user action. The post framework is configured to provide a plurality of posts as a coalesced stack of posts in response to a user action. The post framework is filtered to hide the leg portion. The post framework is configured to be displayed as a card in the social activity stream. Additional information is arranged to be displayed in response to a user action that is visualized as the card being flipped over. A plurality of cards are provided to be displayed as a stack of cards that have been read in which each card corresponds to a post in the social activity stream. The leg portion is configured to display a plurality of comments in nested form. The comments are expanded when a cursor is hovered over a portion of the post framework.

According to another embodiment of the disclosure, a system for providing a social activity stream post framework is provided. The system includes a memory that stores executable instructions and a processor configured to execute the executable instructions. The executable instructions are configured to generate a post framework having a head portion, a body portion, a waist portion and a leg portion. The executable instructions are also configured to arrange identifying information of a posting user in the head portion and to arrange interactive content in the body portion. The executable instructions are further configured to arrange a social network control element in the waist portion and to arrange a user comment in the leg portion. The executable instructions are also configured to arrange a user interface control element in at least one portion of the post framework. The executable instructions are further configured to create a defined container area within the body portion, wherein the defined container area provides a defined area in which a third party partner provides content. The executable instructions are also configured to provide the post framework for display in a social stream on a client device.

These and other embodiments may include one or more of the following features. Executing the executable instructions further causes the system to do one of display concealed metadata providing information related to the post framework or start an action related to information or content in the post framework when a consuming user selects the user interface control element. Executing the executable instructions further causes the system to create a defined container area within the body portion in which the defined container area provides a defined area in which a third party partner provides content. Executing the executable instructions further causes the system to arrange context information of the content in an accessory portion of the post framework.

According to a further embodiment of the disclosure, a non-transitory machine-readable storage medium comprising machine-readable instructions for causing a processor to provide a social activity stream post framework is provided. The method includes using a processor to generate a post framework having a head portion, a body portion, a waist portion, a leg portion and an accessory portion. The method also includes arranging identifying information of a posting user in the head portion and arranging content associated with an interactive application in the body portion. The method further includes arranging a social network control element in the waist portion and arranging a user comment in the leg portion. The method also includes arranging context information of the content in the accessory portion. The method further includes providing the post framework for display in the social activity stream on a client device.

According to another embodiment of the disclosure, a computer implemented method for providing content within a social activity stream is provided. The method includes using a processor to generate a content framework having a body portion. The method also includes arranging first content in a first area of the content body. The method further includes arranging content in the body portion. The method also includes arranging metadata of the first content in a second area of the content body. The method further includes arranging a user interface control element associated with the first content in a third area of the content body. The method also includes providing the content framework with the arranged content body for display in the social activity stream on a client device. Other embodiments include corresponding systems, apparatus, and computer program products.

These and other embodiments may include one or more of the following features. The second area of the content body is overlaid on a portion of the first area of the content body. The third area of the content body is overlaid on a portion of the first area of the content body. The first content is full bleed in the content body. The first content is rich media content comprising a video, a photograph, a graphic image, a map or a video chat slot. The first content is a mosaic of visual representations of people presently participating in a video chat session, wherein the mosaic is configured to dynamically add a new visual representation of a new participant at the time the new person joins the video chat session and to dynamically delete a current visual representation of a present participant when the present participant leaves the video chat session. Arranging second content in a fourth area of the content body. The fourth area of the content body is overlaid on a portion of the first area of the content body. The fourth area is configured to expand within the first area when selected. The first content is a first photograph and the second content is a photo album having at least one additional photograph, wherein the fourth area is configured to show a portion of a number of photographs in the photo album, wherein the expanded fourth area is configured to show at least one of a larger portion of the number of photographs in the photo album and a greater number of photographs in the photo album. The content framework is configured to arrange the second content in the first area of the content body when the second content is selected at the client device. The second content is arranged full bleed in the first area of the content body. The content framework is configured to arrange the first content in the fourth area of the content body. The second content comprises a video, a photograph, a graphic image, a map or a video chat slot. The video chat slot is configured to be flipped over from a static image to a live image of a person when the person joins a group. The video chat slot is configured to slide in from the side to join a display of existing video chat slots. Arranging metadata of the second content overlaid on the second content. The content framework is configured to hide the metadata of the second content until a cursor is hovered over a portion of the content body. The content framework is configured to conceal a portion of the second content until a cursor is hovered over a portion of the second content. The content body is arranged in a business card format. The content body is configured to expand when the first content is selected. The first content is a portion of an interactive map in full bleed within a first distinct visual boundary and an expanded portion of the interactive map in full bleed within a second distinct visual boundary. The first content is a post that has been re-shared from another social activity stream.

According to yet another embodiment of the disclosure, a system for providing interactive content within a social activity stream is provided. The system includes a memory that stores executable instructions and a processor configured to execute the executable instructions. The executable instructions are configured to generate a content framework comprising a content body. The executable instructions are also configured to arrange first content in a first area of the content body. The executable instructions are further configured to arrange metadata of the first content in a second area of the content body. The executable instructions are also configured to arrange a user interface control element associated with the first content in a third area of the content body. The executable instructions are further configured to arrange second content in a fourth area of the content body. The executable instructions are also configured to provide content framework for display in a social activity stream on a client device, wherein at least one of the second area, the third area and the fourth area of the content body is overlaid on a portion of the first area of the content body.

These and other embodiments may include one or more of the following features. Executing the executable instructions further cause the system to arrange metadata of the second content overlaid on the second content in which the content framework is configured to hide the metadata of the second content until a cursor is hovered over a portion of the content body. Executing the executable instructions further causes the system to arrange the second content in full bleed in the first area of the content body when the second content is selected by the client device.

According to a further embodiment of the disclosure, a non-transitory machine-readable storage medium comprising machine-readable instructions for causing a processor to provide interactive content within a social activity stream is provided. The method includes using a processor to generate a content framework including a content body. The method also includes arranging first content in a first area of the content body. The method further includes arranging metadata of the first content in a second area of the content body. The method also includes arranging a user interface control element associated with the first content in a third area of the content body. The method further includes arranging second content in a fourth area of the content body. The method also includes providing the content framework for display in the social activity stream on a client device, wherein at least one of the metadata and the second content is provided to be displayed only when a pointing symbol is hovered over a portion of the content body.

These and other embodiments may include one or more of the following features. Providing a post framework that improves the content sharing experience by providing a clear separation of shared content from the post metadata and social metadata, as well as providing scalability when adding new features. Also, providing a design framework that improves the content sharing experience may motivate users to share more content in the social stream and may motivate more users to consume content.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, that the implementations of the present disclosure may be practiced without some of these specific details. In other instances, some structures and techniques have not been shown in detail so as not to obscure the disclosure.

Figure 1:
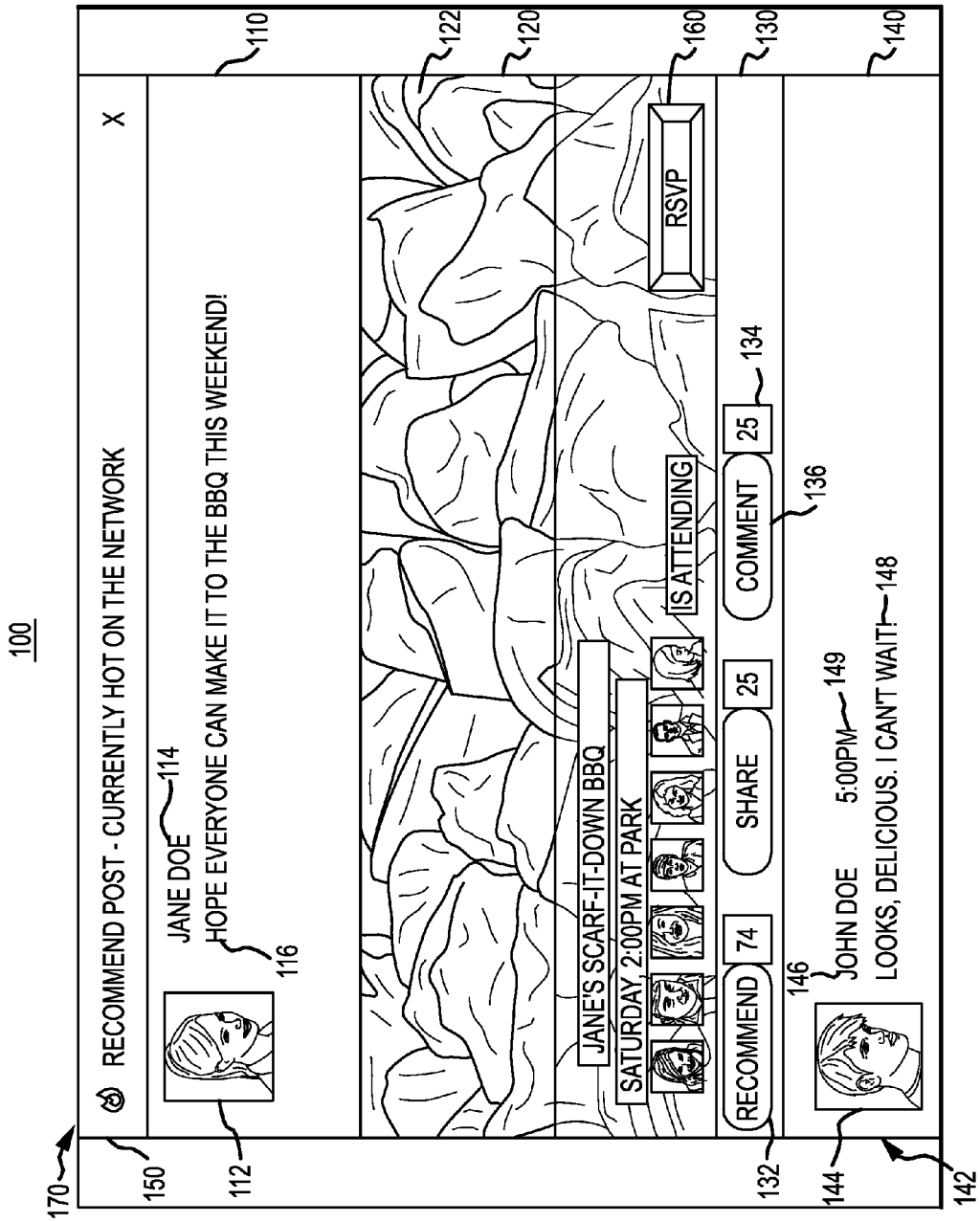
FIG. 1 is an example illustration of an implementation of a social activity stream post framework displayed on a client device.

As illustrated in FIG. 1, the disclosed post framework system is configured to provide a post framework 100 having a head portion 110, a body portion 120, a waist portion 130, a leg portion 140, an accessory portion 150, and a user interface control element 160. The head portion 110 may be thought of as the voice of the posting user sharing the content. For example, the head portion 110 may include a thumbnail photograph of the posting user who is sharing the content, the posting user's name in text, and a text explanation of the shared content. A consuming user who has received a post 170 that has been arranged according to the post framework 100 may be able to look at the head portion 110 and quickly understand who sent the post 170 and what the subject matter of the post 170 is about.

The body portion 120 of the post framework 100 includes content, e.g. images, videos, links, maps, and other media, that is being shared by the posting user. The body portion 120 provides a defined space for the content that is separate and distinct from the other parts of the post framework 100. The separate space for content allows a consuming user to easily view and/or interact with the shared content, thereby enjoying a rich and immersive experience with the content.

The waist portion 130 is also included in the post framework 100 to provide interactive actions that a consuming or viewing user is able to take regarding the content of the post framework 100. For example, the waist portion 130 may be provided as a tool belt of actions, e.g. a button for sharing the content with other users or a button for commenting on the content. In addition, the post framework 100 further includes the leg portion 140, which includes comments from consuming users that keep a post current in a social activity stream. The comments may be arranged in any suitable order, e.g. the most recent comment on top, for example.

The accessory portion 150 may also be included with the post framework 100 to provide explanations for why a post is showing up in a stream or for allowing similar posts to stack like physical cards. All of the post framework elements may provide some level of interactivity to the viewing/consuming user through user interface control elements 160, e.g. hovering to display concealed metadata and/or interactive buttons or links. The combination of the post framework 100 and information/content provided by the posting user forms the social activity stream post 170, which may be shared with consuming users. A consuming user can therefore easily find and experience the shared content, as well as interact with all aspects of the post framework 100, thereby improving the consuming user's experience and motivating more users to share and consume the content.

For example, a social network user Jane Doe may wish to invite a group of social network users to a weekend barbeque. As shown in FIG. 1, Jane Doe may create a post 170 using post framework 100 and send the post 170 to a particular group of friends through the social network. The head portion 110 may provide a thumbnail photograph of Jane Doe, her name, and the descriptive text "Hope everyone can make it to the bbq this weekend!" Below the head portion 110, the post framework 100 may provide a picture of food on a barbeque grill. The picture may be in full bleed, which covers the entire defined area of the body portion 120. Also provided in the body portion 120 may be the text "Jane's scarf-it-down fall BBQ, Saturday, 2:00 PM at the park" and a series of thumbnail photographs showing other people who are going to attend, all of which may be overlaid on the picture of the food. A user interface control element 160 may also be provided in the body portion 120 in the form of an "RSVP" button.

Continuing the example, the waist portion 130 may be below the body portion 120, providing user interface control elements 160 in the form of interactive buttons that the consuming user may select to get a list of others who recommended, shared or commented on Jane Doe's barbeque invitation. Below the waist portion 130, the post framework 100 may provide the leg portion 140, which may include comments made by users about Jane Doe's post, e.g. John Doe's thumbnail photograph, name and comment "Looks delicious. I can't wait!" An accessory portion 150 in the form of a hat or a scarf may also be provided to explain why this post of Jane Doe's barbeque invitation is showing up in this particular social activity stream.

As another example, a social network user John Doe may wish to share some videos taken on a recent vacation trip to Hawaii. John Doe creates a post using a post framework and sends the post to a group of users on a social network. The head portion may provide a thumbnail photograph of John Doe, his name, and the descriptive text "see my Hawaiian vacation highlights!" A home video that is in full bleed may be provided in the body portion, which may further include transparent interactive "play" and "pause" buttons overlaid on the video. Share, comment and translate buttons may be provided in the waist portion. The leg portion may include comments made by other users on the social network about John Doe's music video selections. An explanation as to why this post of John Doe's Hawaiian highlights has been provided in the social activity stream may also be provided as a hat or scarf.

A consuming user who receives the post may interact with user control elements that are in any portion of the post framework. Continuing with the John Doe video highlight example, the consuming user may interact with the video controls within the body portion, e.g. by pressing play to view the video. Thus, a consuming user may view and interact with the shared content without ever having to leave the activity stream or even the content body itself. The consuming user may also interact with the waist portion by selecting a post action e.g. adding a comment. Hovering the cursor anywhere in the post framework may allow the consuming user to bring up relevant hidden metadata, e.g. a timestamp, information on post visibility, and the post source, for example. The consuming user may further interact with the leg portion of the post framework by hovering the cursor over a comment, thereby allowing the consuming user to flag the comment for abuse or delete the comment, for example.

While many examples are provided herein in the context of providing a post framework 100 for a social activity stream, the principles of the present disclosure contemplate other types of post framework features as well. For example, collapsing a post framework 100 to hide the content, stacking multiple posts 170, and defining specific parameters for allowing content providers e.g. third party advertisers to interact with the post framework 100, are all considered within the scope of the present disclosure.

Figure 2:
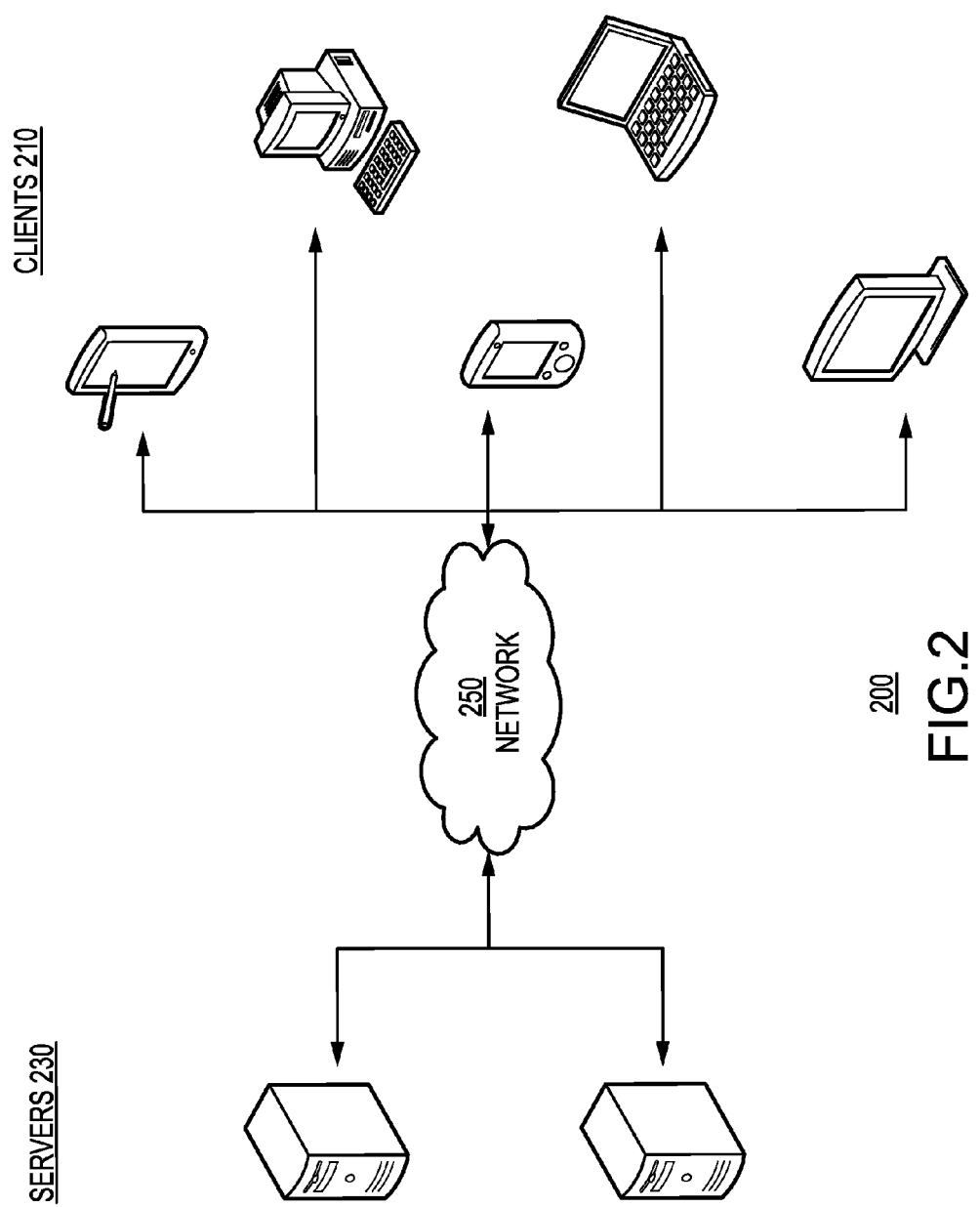
FIG. 2 illustrates an example architecture for providing a social activity stream post framework and content framework.

Turning to the other drawings, FIG. 2 illustrates an example architecture 200 for providing a post and/or content framework for use in a social activity stream and displaying a post using the post and/or content framework on a device. The architecture 200 includes servers 230 and clients 210 connected over a network 250.

Each of the clients 210 is configured to run an information interface (e.g., web browser or other application) that provides access to social activity streams in which users share content with other users through a post framework that provides a consistent look and feel to the users and/or a content framework that provides a defined canvas or container for displaying content. The web browser or other application is configured to run on clients 210 that are mobile or non-mobile. The clients 210 can be, for example, user devices e.g. desktop computers, laptop computers, mobile devices (e.g., a smartphone, tablet computer, or PDA), set top boxes (e.g., for a television), video game consoles, or any other devices having processor, memory, and communications capabilities.

The post and/or content framework can be downloaded over the network 250 from one or more servers 230. Multiple servers 230 can host the data for creating or sharing a post and/or content framework. The servers 230 can also download post and/or content framework information. The servers 230 can be any device having a processor, memory, and communications capability for generating framework information and/or hosting data related to generating post framework information (e.g., any or all of the head portion, the body portion, the waist portion, the leg portion and the accessory portion) and content framework information (e.g., any or all of the content body, the content, the user interface control element and the metadata). The network 250 can include, for example, any one or more of a personal area network (PAN), a local area network (LAN), a campus area network (CAN), a metropolitan area network (MAN), a wide area network (WAN), a broadband network (BBN), the Internet, and the like. Further, the network 250 can include, but is not limited to, any one or more of the following network topologies, including a bus network, a star network, a ring network, a mesh network, a star-bus network, tree or hierarchical network, and the like.

Figure 3:
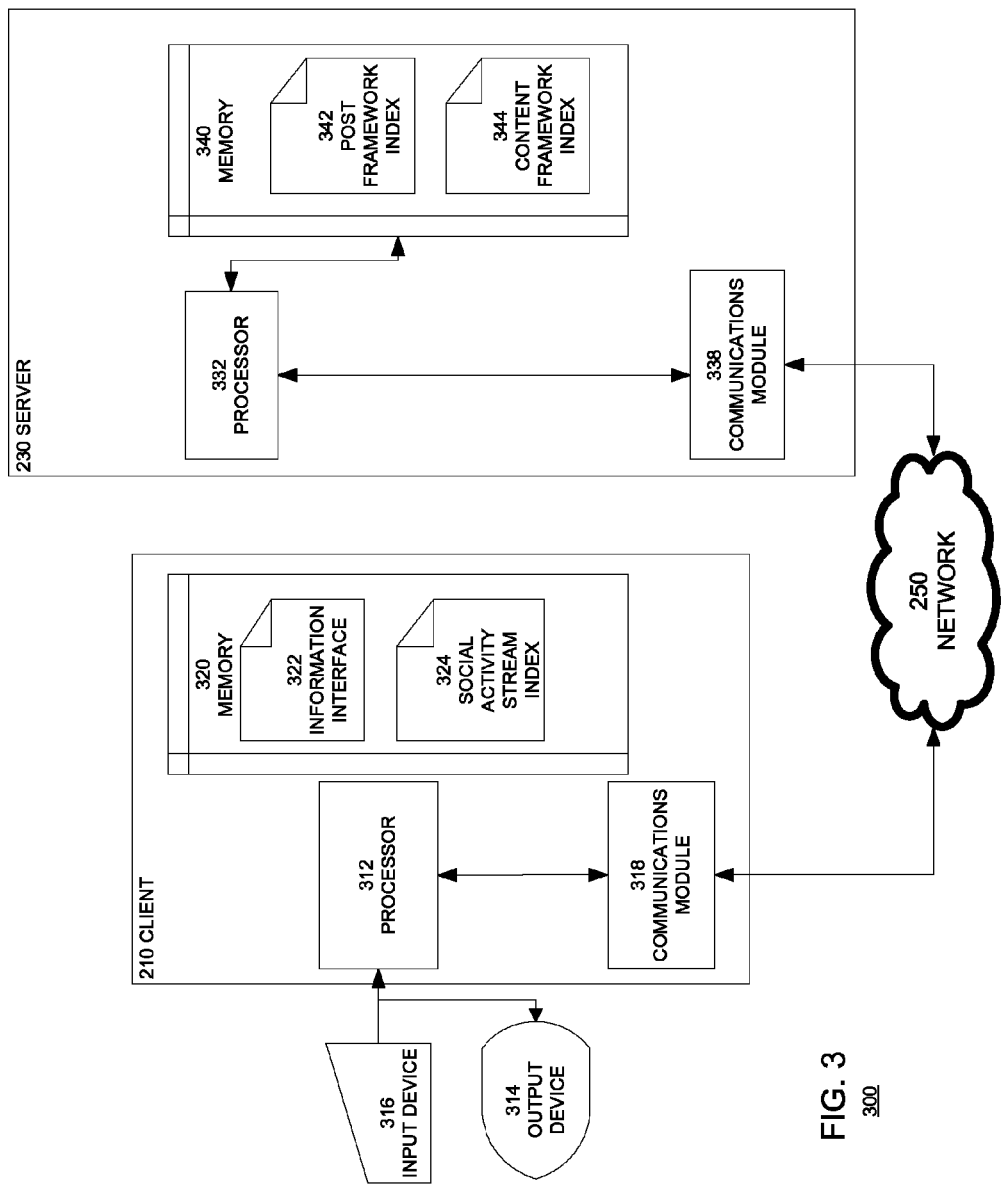
FIG. 3 is a block diagram illustrating an example client and server from the architecture of FIG. 2 according to certain aspects of the disclosure.

FIG. 3 is a block diagram 300 illustrating an example server 230 and client 210 in the architecture 200 of FIG. 2 according to certain aspects of the disclosure. The client 210 and the server 230 are connected over the network 250 via client communications module 318 and server communications module 338. The communications modules 318 and 338 are configured to interface with the network 250 to send and receive information, e.g. data, requests, responses, and commands to other devices on the network. The communications modules 318 and 338 can be, for example, modems or Ethernet cards and may be configured as transmitters and/or receivers.

The client 210 includes a client processor 312, the client communications module 318, and a client memory 320 that includes an information interface 322, e.g. a web browser, for example. The client memory 320 may also include a social activity stream index 324 for storing information (e.g., a received social activity stream post, post framework information, content or metadata). The client 210 also includes an output device 314, e.g. a display, to provide information to the user, and an input device 316, e.g. a keyboard, touchscreen, or mouse, to receive user inputs. The post may be received from the server 230 over the network 250 using respective communications modules 318 and 338 of the client 210 and server 230. Specifically, the server 230 may generate a post framework or use an existing post framework in order to generate and send a post to the client 210 for display of the post in a social activity stream. Server 230 may also generate or use a content framework to construct a post, which the server 230 provides to the client 210 for display of the post in a social activity stream. Alternatively, the client 210 may be configured to perform any or all of the functions required to generate or use a post framework or a post, such that the server 230 is not required to provide the post framework/post, or is only required to provide a portion of the post framework/post and/or information required to generate or use a post framework/post, for example.

The server 230 includes a server processor 332, the server communications module 338, and a server memory 340. The server processor 332 is configured to execute instructions, e.g. instructions physically coded into the server processor 332, instructions received from software in the server memory 340, or a combination of both. For example, the server processor 332 executes instructions from the server memory 340 to arrange information in any of the head portion, the body portion, the waist portion, the leg portion and the accessory portion of the post framework. The information may be stored in the server memory 340, received from other sources (e.g., other servers, sensors, clients), or a combination of both. For example, post framework information may be stored in a post framework index 342 and content to be shared in a social activity stream post may be provided by another server. In another example, content framework information, e.g. metadata or actions to be performed when a user interface control element is selected, may be stored in a content framework index 344 and content to be shared in a social activity stream post may be provided by another server.

By way of example, a social networking application includes a post framework design for a user of the social networking application to share a video with other users. The system may arrange the posting user's picture as a thumbnail picture alongside the posting user's name in the head portion 110 of the post framework 100. The system may also arrange the video in full bleed in the body portion 120 of the post framework 100, and may further overlay transparent video play, rewind and pause buttons 160 on the video. In addition, the system may arrange connection, share, and comment buttons 160 in the waist portion 130 of the post framework 100. The completed social networking post 170 may then be sent by a social networking server 230 to members of the social network designated to receive the post 170. A consuming user may view the posting user's post 170 as it is displayed on a client device 210, and may interact with the post 170 by selecting the video play button 160 to view the video shared by the posting user.

Figure 4:
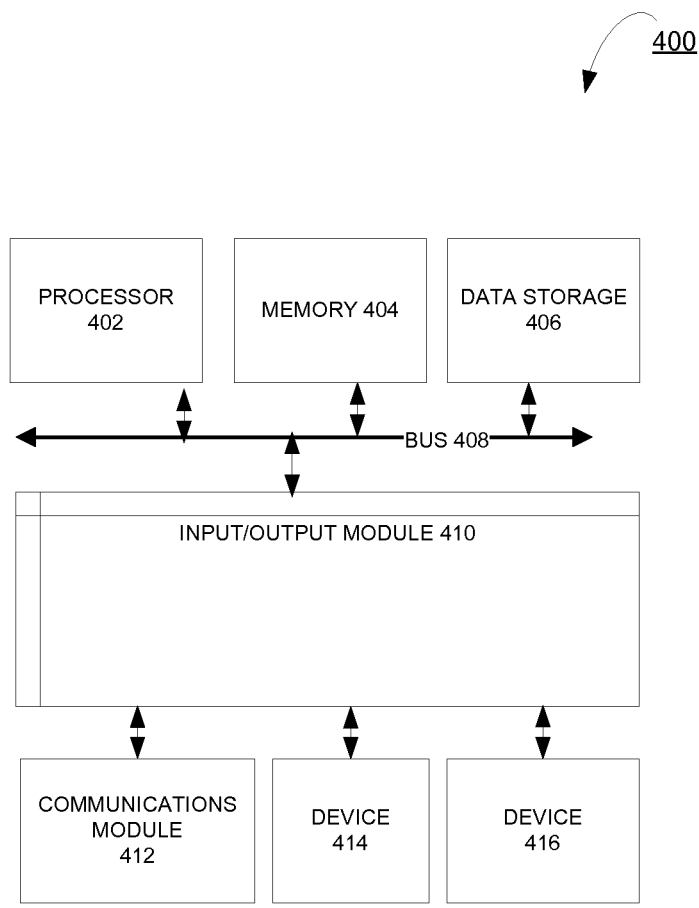
FIG. 4 is a block diagram illustrating an example computer system with which the client and server of FIG. 2 can be implemented.

FIG. 4 is a block diagram illustrating an example computer system 400 with which the client 210 and server 230 of FIG. 3 can be implemented. In certain aspects, the computer system 400 may be implemented using hardware or a combination of software and hardware, either in a dedicated server, or integrated into another entity, or distributed across multiple entities.

Computer system 400 (e.g., client 210 and server 230) includes a bus 408 or other communication mechanism for communicating information, and a processor 402 (e.g., processor 312 and 332) coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question (e.g., code that constitutes processor firmware, a protocol stack, a database management system, an operating system, or a combination of one or more of them) stored in an included memory 404 (e.g., memory 320 and 340), e.g. a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, e.g., one or more modules of computer program instructions encoded on a computer readable medium for execution by, or to control the operation of, the computer system 400, and according to any method including, but not limited to, computer languages e.g. data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages e.g. array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 e.g. a magnetic disk, solid state disk (SSD) or optical disk, coupled to bus 408 for storing information and instructions. Computer system 400 may be coupled via input/output module 410 to various devices. The input/output module 410 can be any input/output module. Example input/output modules 410 include data ports e.g. USB ports. The input/output module 410 is configured to connect to a communications module 412. Example communications modules 412 (e.g., communications modules 318 and 338) include networking interface cards, e.g. Ethernet cards and modems. In certain aspects, the input/output module 410 is configured to connect to a plurality of devices, e.g. an input device 414 (e.g., input device 316) and/or an output device 416 (e.g., output device 314). Example input devices 414 include a keyboard and a pointing device, e.g., a mouse or a trackball, by which a user can provide input to the computer system 400. Other kinds of input devices 414 can be used to provide for interaction with a user as well, e.g. a tactile input device, visual input device, audio input device, or brain-computer interface device. For example, feedback provided to the user can be any form of sensory feedback (e.g., visual feedback, auditory feedback, or tactile feedback); and input from the user can be received in any form, including acoustic, speech, tactile, or brain wave input. Example output devices 416 include display devices, e.g. a cathode ray tube (CRT) or liquid crystal display (LCD) monitor, for displaying information to the user.

According to one aspect of the present disclosure, the client 210 and server 230 can be implemented using a computer system 400 in response to processor 402 executing one or more sequences of one or more instructions contained in memory 404. Such instructions may be read into memory 404 from another machine-readable medium, e.g. data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component (e.g., as a data server), or that includes a middleware component (e.g., an application server), or that includes a front end component (e.g., a client computer having a graphical user interface or a Web browser) through which a user can interact with an implementation of the subject matter described in this specification, or any combination of one or more such back end, middleware, or front end components. The components of the system can be interconnected by any form or medium of digital data communication (e.g., a communication network). The communication network (e.g., network 250) can include, for example, any one or more of a personal area network (PAN), a local area network (LAN), a campus area network (CAN), a metropolitan area network (MAN), a wide area network (WAN), a broadband network (BBN), the Internet, a cloud and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 402 for execution. Such a medium may take many forms, including, but not limited to, non-volatile media and volatile media. Non-volatile media include, for example, optical or magnetic disks, e.g. data storage device 406. Volatile media include dynamic memory, e.g. memory 404. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, or a combination of one or more of them.

Figure 5:
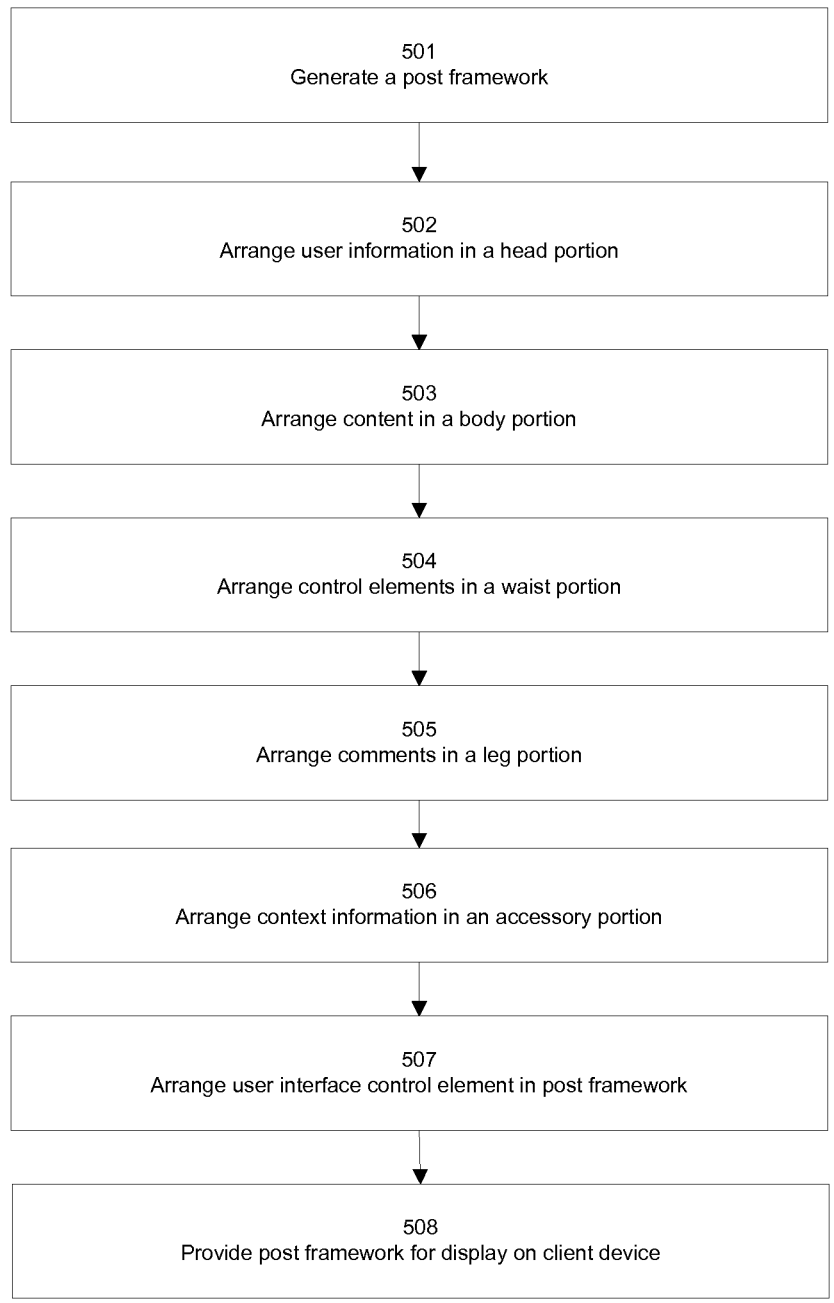
FIG. 5 illustrates an example process for providing a social activity stream post framework.

FIG. 5 illustrates an example process 500 using the example server 230 of FIG. 3 for providing the social activity stream post framework of FIG. 1. The process 500 begins at step 501 when a post framework is generated by a processor based entity (e.g., a server, a client or a computer system). The post framework 100 includes a head portion 110, a body portion 120, a waist portion 130, a leg portion 140, an accessory portion 150 and a user interactive control element 160. The post framework 100 may be generated to be consistent in form over a variety of social activity streams, e.g. social networking applications/sites or discussion groups, for example. Proceeding to step 502, identifying information of the posting user is arranged in the head portion 110. A visual identification section 112, e.g. a thumbnail photograph, may be arranged at the top left corner of the head portion 110. Alternatively, a graphical image or a symbol associated with the posting user may also be used. A text identification section 114, e.g. the posting user's name, nickname, or social media handle, may also be arranged in the head portion 110. A descriptive text section 116 describing the subject matter of the post 170 may further be arranged in the head portion 110. For example, as seen in FIG. 1, the head portion 110 includes Jane Doe's thumbnail photograph 112, her name 114, and the text description 116 "Hope everyone can make it to the bbq this weekend!"

In step 503, content 122 is arranged in the body portion 120 of the post framework 100. The body portion 120 is a defined area of the post framework 100 that allows for the content 122 to be the focus of the post by providing clear separation of the content 122 from the posting user's voice, social metadata, comment discussion and actions. The content 122 may include interactive features e.g. control buttons or hidden metadata that is revealed when a cursor is hovered over the content 122, for example. The self-contained body portion 120 allows the consuming user to easily explore an immersive experience in-line in the social activity stream without having to navigate away and lose his/her place in the social activity stream.

For example, in the Jane Doe invitation shown in FIG. 1, the body portion 120 shows a picture of food on a barbeque grill in full bleed, which covers the entire defined area of the body portion 120. Overlaid on the bottom portion of the picture of the food is an area that includes the text "Jane's scarf-it-down fall BBQ, Saturday, 2:00 PM at the park", a series of thumbnail photographs showing other people who are going to attend, and an RSVP button. Therefore, the consuming user can see the full picture posted by Jane Doe, while simultaneously seeing when and where the event is taking place and who is going to attend the event, and while also being able to click on the RSVP button to indicate that he/she will attend, all without ever leaving the body portion 120 of the post framework 100.

In step 504, social network control elements 132 are arranged in the waist portion 130. The social network control elements 132 may include a number display area 134 that provides a number related to the social network control elements 132, and an interactive button 136 that provides additional information related to the social network control elements 132 when selected. For example, a number display area 134 may show how many people reshared the content 122 in the content body 120 and an interactive button 136 may show a list of the people who reshared the content 122 when it is selected. Other social network control elements 132 may be related to the number of people who recommended the content 122 or the number of people who commented on the content 122, for example. The lists provided by selecting the interactive button 136 may be sorted by affinity or by any other suitable manner. As shown in FIG. 1, the waist portion 130 of the Jane Doe invitation includes the social network control elements 132 of "Recommend", "Share" and "Comment".

In step 505, a user comment 142 is arranged in a leg portion 140. The user comment 142 may include a thumbnail photograph of the commenting user 144, the commenting user's name 146, and the commenting user's comments 148, for example. The user comment 142 may also include a date/time section 149 that provides a time stamp of when the commenting user posted the user comment 142. For example, in the Jane Doe invitation shown in FIG. 1, the user comment 142 includes a thumbnail photograph of John Doe, John Doe's name, the time of 5:00 PM when John Doe posted the comment, and John Doe's comment "Looks delicious, I can't wait!" Proceeding to step 506, context information of the content is arranged in an accessory portion 150. The context information may provide information as to why the post 170 is provided in a particular social activity stream.

In step 507, a user interface control element 160 is arranged in the post framework 100. The user interface control element 160 may be associated with any portion of the post framework 100. For example, a user interface control element 160 may provide for revealing concealed metadata about the post framework 100 when a cursor is hovered anywhere on the post framework 100. The concealed metadata may be a timestamp, information on the visibility of the post, or information on the source of the post, for example. The user interface control element 160 may also include revealing concealed actions when a cursor is hovered anywhere on the post framework 100. For example, concealed actions e.g. linking to the post 170, reporting abuse on the post 170, locking the post 170, or indicating the importance of the post 170 may be provided. Any suitable combination of concealed metadata and concealed actions may be included in the post framework 100.

In addition, the user interface control element 160 may be configured to be associated with a specific portion of the post framework 100. For example, a user interface control element 160 may be associated only with the leg portion 140, such that a concealed action is revealed when a cursor is hovered over a user comment 142. Recommending the user comment 142, flagging the user comment 142 for abuse, deleting the user comment 142, and translating the user comment 142 may be provided as concealed actions associated with the leg portion 140. The concealed action may be revealed as a button, a link, or any other suitable visual representation that is selectable after being revealed, for example. Alternatively to being a concealed action, an action related to the post framework 100 may be provided as a lightweight or transparent button, which fills in to become an opaque button when a cursor is hovered over the action. In addition, the action may be provided to be selectable only when the concealed action is revealed or the transparent button is filled in, for example. In the Jane Doe invitation example shown in FIG. 1, a user control interface element 160 is provided as the RSVP button.

The example process 500 ends in step 508, in which the post framework 100 is provided for display in the social activity stream on a client device 210. The post framework 100 may be arranged and displayed such that the head portion 110, the body portion 120, the waist portion 130 and the leg portion 140 are shown in vertically descending order, thereby resembling a blocky stick figure, for example. In addition, the accessory portion 150 may be arranged and displayed on top of the head portion 110 like a hat or between the head portion 110 and the body portion 120 like a scarf around the neck. Alternatively, the post framework 100 may include any combination of the head portion 110, the body portion 120, the waist portion 130, the leg portion 140, the accessory portion 150 and the user interface control element 160, which may be provided to be displayed in any suitable arrangement. The post framework 100 may be provided as a common post framework over a plurality of social activity stream types.

In addition, the post framework 100 may be configured to be collapsed to hide one or more portions. For example, the post framework 100 may be configured to collapse to hide the body portion 120 and the post framework 100 may be configured to be provided for display in the form of a card, e.g. a business card for example. Multiple full or collapsed posts 170 may be stacked like a stack of cards. For example, the posts 170 may be stacked after having been viewed by the consuming user and related posts 170 may be coalesced together to minimize the display area taken up on a client device 210. The post framework 100 provided in the form of a card may be further configured to display additional information to a consuming user when the consuming user selects an action, the additional information being provided visually to the user as the card being flipped over to reveal the additional information. Alternatively, the post framework 100 may be configured to expand the body portion 120 in response to a user action so as to show more of the body portion 120, for example.

The post framework 100 may also be configured to provide filtering of any portion. For example, the post framework 100 may be filtered to hide the leg portion 140, thereby hiding the comment stream from being displayed. Alternatively, the leg portion 140 may be filtered to only show certain user comments 142 and to hide others, or to display a plurality of user comments 142 in nested form, for example. The post framework 100 may be further configured to provide expanded user comments 142 when a user clicks on a portion of the post framework 100.

Each of steps 501 through 508 may be performed by any combination of servers 230, clients 210 or computer systems 400. For example, all of steps 501 through 508 may be performed by a single server 230, or each of the steps may be performed by a different server 230. Alternatively, any or all of steps 501 through 508 may be performed by the client 210 that is the user's device, or by any combination of the user device client 210, other clients 210, servers 230 and computer systems 400, for example.

An example will now be described using the example process 500 of FIG. 5, a server 230, a server memory 340, a post framework index 342, a network 250, a smartphone client 210, an output device 314, and a mobile web browser 322.

The process 500 begins when it is desired to use a post framework to provide a post for use within a social activity stream associated with a social networking application. In step 501, the server 230 generates a post framework or uses an existing post framework, storing the post framework in a post framework index 342 in a server memory 340. In step 502, the server 230 arranges information in a head portion, e.g. a thumbnail photograph of the posting user John Doe, John Doe's name, and a description "Check out my current favorite music videos!"

In step 503, the server 230 may arrange a first music video in full bleed in a body portion positioned below the head portion. The server 230 may also arrange second through fifth music videos in thumbnail sections overlaid side-by-side on the bottom area of the first music video. Each video may be provided to be displayed in a cued-up position in which the image displayed is a still image of the beginning of the music video. In step 504, the server 230 arranges social network control elements in the form of a "recommend" button, a "share" button, and a "comment" button on a waist portion positioned below the body portion.

The server 230 may also arrange user comments in a leg portion positioned below the waist portion in step 505. The user comment may consist of a thumbnail picture of a consuming user Jane Doe, Jane Doe's nickname "MusicLover", and the comment "Those are some of my favorite bands too!". In step 506, the server 230 may arrange the description "Music for friends of John Doe" in an accessory portion positioned above the head portion. The server 230 may also arrange user interface control elements in the form of a play button overlaid on the first music video and hidden select buttons overlaid on each of the second through fifth music videos, in step 507.

The server 230 may obtain all of the information that is arranged in the post in any suitable manner. For example, the server 230 may have any or all of the information stored in the server memory 340. Alternatively, the server 230 may obtain any or all of the information from other servers 230, the posting user's client 210, or other clients 210. For example, as the posting user is creating a post, the server 230 may provide the posting user's thumbnail photograph and name and the social network control buttons, while the posting user's client 210 may provide text describing the content, the content itself, and any desired user interface controls. Further, other user's clients 210 may provide comments that the server 230 arranges in the post.

The process ends in step 508, in which the server 230 provides the post for display in the social activity stream on the display screen 314 of Jane Doe's smartphone 210 after Jane Doe uses her web browser 322 to access the social activity stream on the Internet. The posted videos may be public domain videos that are simply being shared by John Doe. Alternatively, the posted videos may be provided by a third party entity that sells music videos and John Doe's post may include a "Buy" button in the body portion, such that the consuming user Jane Doe may purchase and download a music video directly from the post. The post framework may provide a clearly defined container in the body portion for the use of the third party music video seller, thereby controlling the amount of the post framework that the third party may use.

In general, when a user or entity wishes to post content on a social network, the user or entity selects or uploads particular content and provides information about the content, e.g. titles, comments, captions and the like. A server takes the content and the information provided by the posting user or posting entity and uses a content framework to construct a post. The server sends the post to other users in the social network for display in those users' social activity streams. The arrangement of the content and the information within the body, and the control elements that are included, may be selected by the server based on the type of content provided and may be specified by the posting user when the content is selected or uploaded for posting. The content framework provides this flexible, standard container for different types of content that allows the consuming user to interact with the content directly in the social activity stream without having to leave the stream.

Figure 6:
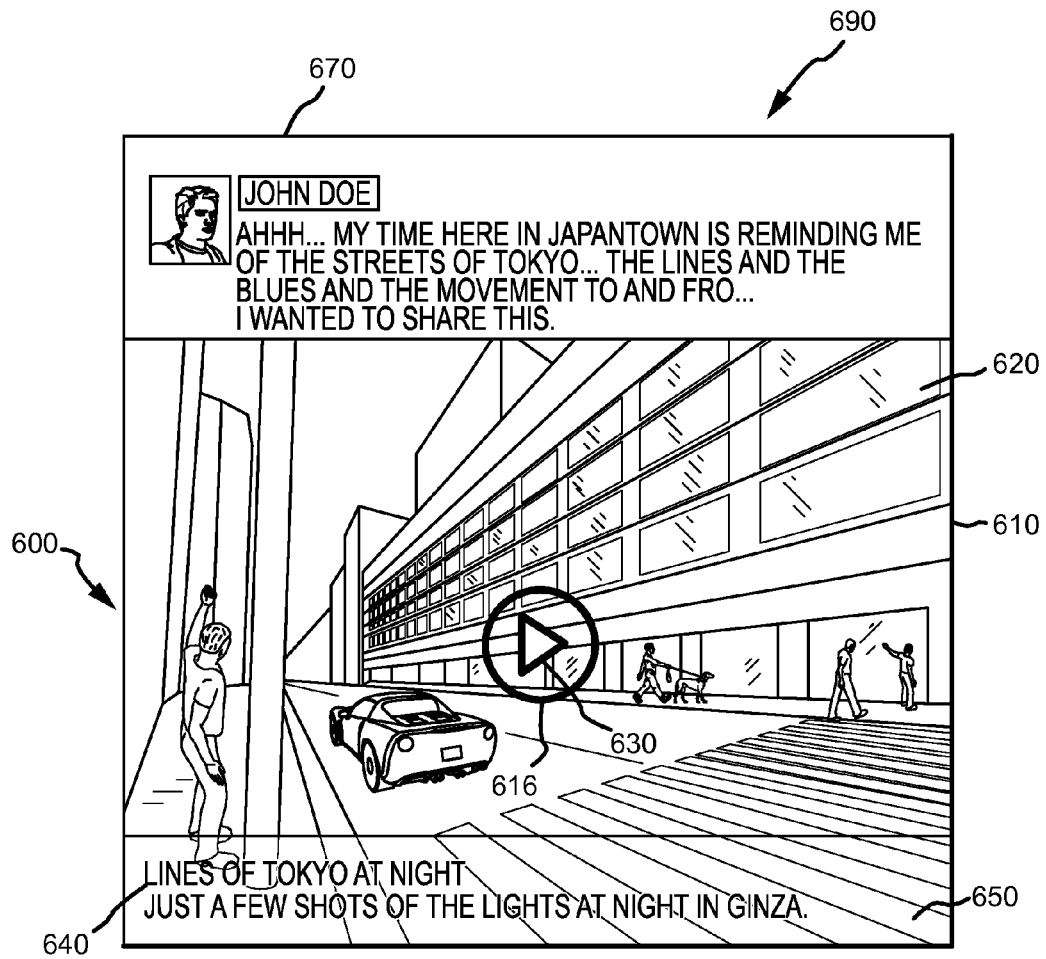
FIG. 6 is an example illustration of an implementation of a content framework in a social activity stream displayed on a client device.

As illustrated in FIG. 6, the disclosed content framework system is configured to provide a content framework 600 having a content body 610 that includes content 620, e.g. images, videos, links, maps, and other content, that is being shared by a posting user. The content body 610 provides a defined space for the content 620 that is separate and distinct from the other parts of a post framework 690. For example, the content 620 may be configured to be displayed in full bleed within the content body 610 (e.g., to the edges of the content body), or in only a portion of the content body 610.

The content framework 600 may further include a user interface control element 630, e.g. an interactive button or a link, for example. The user interface control element 630 may be integrated with the content 620. For example, the user interface control element 630 may be overlaid on the content 620 as a solid or transparent button, or be configured to be a hidden button that causes an action when a cursor is hovered over the hidden button. The content framework 600 may further include metadata 640 associated with the content 620 and that is arranged in the content body 610. For example, the metadata 640 may be a description of the content 620, an invitation, a command, or a specification. The metadata may be configured to be overlaid on the content 620, or it may be configured to be hidden until a cursor is hovered over an area of the content body 610.

For example, as shown in FIG. 6, a social activity stream user John Doe may wish to share content 620 consisting of a video taken on a recent trip to Tokyo. John Doe provides the video and some comments through a client device to a server. The server then uses a content framework 600 to construct a post 670 in which the video is to be displayed in a content body 610. The video is configured to be displayed at full bleed in the content body 610, so that the video fills the entire defined space of the content body 610. The content framework 600 also provides a user interface control element 630 in the form of a partially transparent play button that is overlaid on the video. The content framework 600 further provides a transparent overlay 650 overlaid on the video. The transparent overlay 650 includes metadata 640 that provides a description of the video as "Lines of Tokyo at Night Just a few shots of the lights at night in Ginza." After the post 670 is constructed by the server, the server provides the post 670 to other user's social activity streams in a social network.

A consuming user who receives a post 670 in a social activity stream may interact directly with the content 620 in the content body 610 of the post 670 without having to leave the social activity stream. Continuing with the John Doe video example, the consuming user may interact with the video within the content body 610, e.g. by pressing the play button to view the video. The play button may change into another user interface control element 630 when the video starts playing, e.g. a pause button or a stop button. Metadata 640 may be overlaid on the content 620 or arranged in an area of the content body 610 other than where the content 620 is displayed. In addition, metadata 640 may be concealed such that it is revealed in the content body 610 when a cursor is hovered over a portion of the content body 610. Thus, John Doe may play, pause or stop the video and reveal concealed metadata by hovering the cursor over a portion of the content body 610, all without having to leave the post 670 or the social activity stream.

Figure 7:
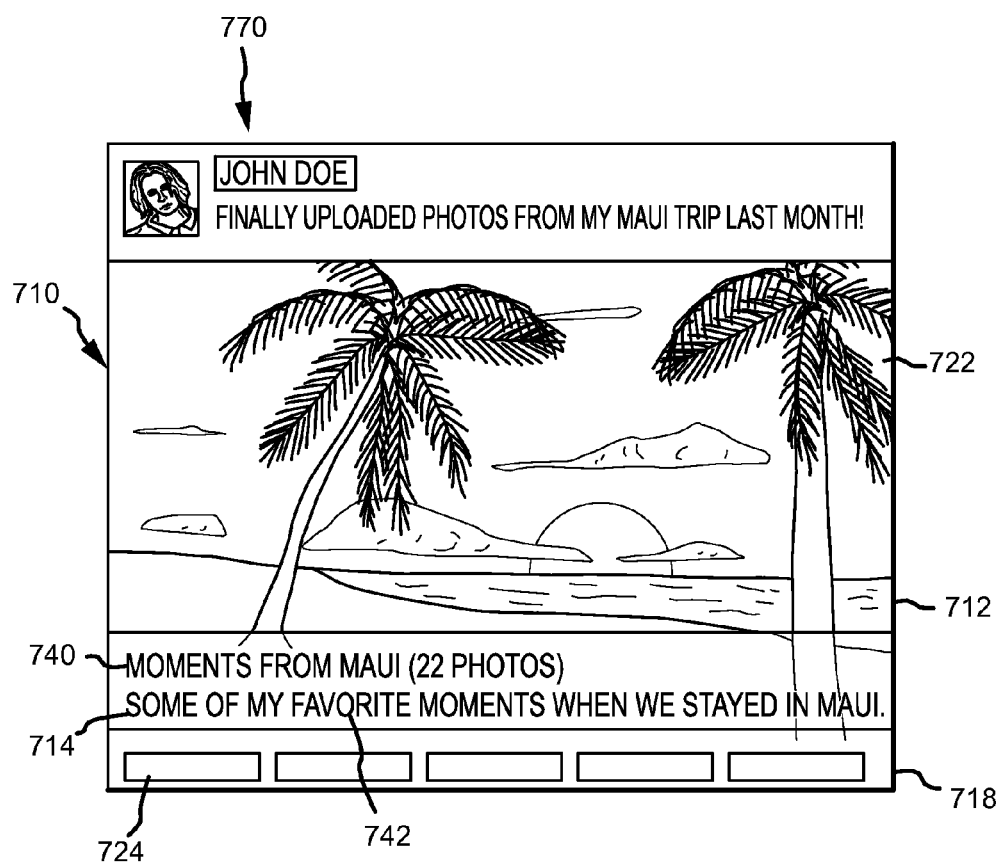
FIG. 7 is an example illustration of another implementation of a content framework in a social activity stream displayed on a client device.

By way of example, a social networking application includes a content framework design for a user of the social networking application to share a series of photographs with other users. Turning to the example shown in FIG. 7, the system may arrange a first content 722 in the form of a photograph in full bleed in a first area 712 of a content body 710. The system may also arrange a second content 724 in a fourth area 718 of the content body 710, e.g. in the form of additional photographs in thumbnail form over a bottom portion of the first photograph, for example. In addition, the system may also arrange hidden user interface control elements over each thumbnail photograph so that when a cursor is hovered over a thumbnail photograph, the thumbnail photograph expands. Also, if the expanded thumbnail is selected by clicking the mouse, the thumbnail photograph and the first full bleed photograph may be interchanged. The system may further arrange metadata 740 in a second area 714 of the content body 710, e.g. text 742 overlaying a portion of the first photograph. In this example, the metadata 740 describes where the series of photographs is from and/or what the subject of the photographs is. The completed arrangement of content, user interface control elements, and metadata 740 within the content body 710 is then sent by the posting user as a social networking post 770 to selected members of the posting user's social network. A consuming user displays the posting user's post 770 on a client device and interacts with the post 770 by selecting the photographs that the consuming user wishes to view in full bleed display.

Figure 8:
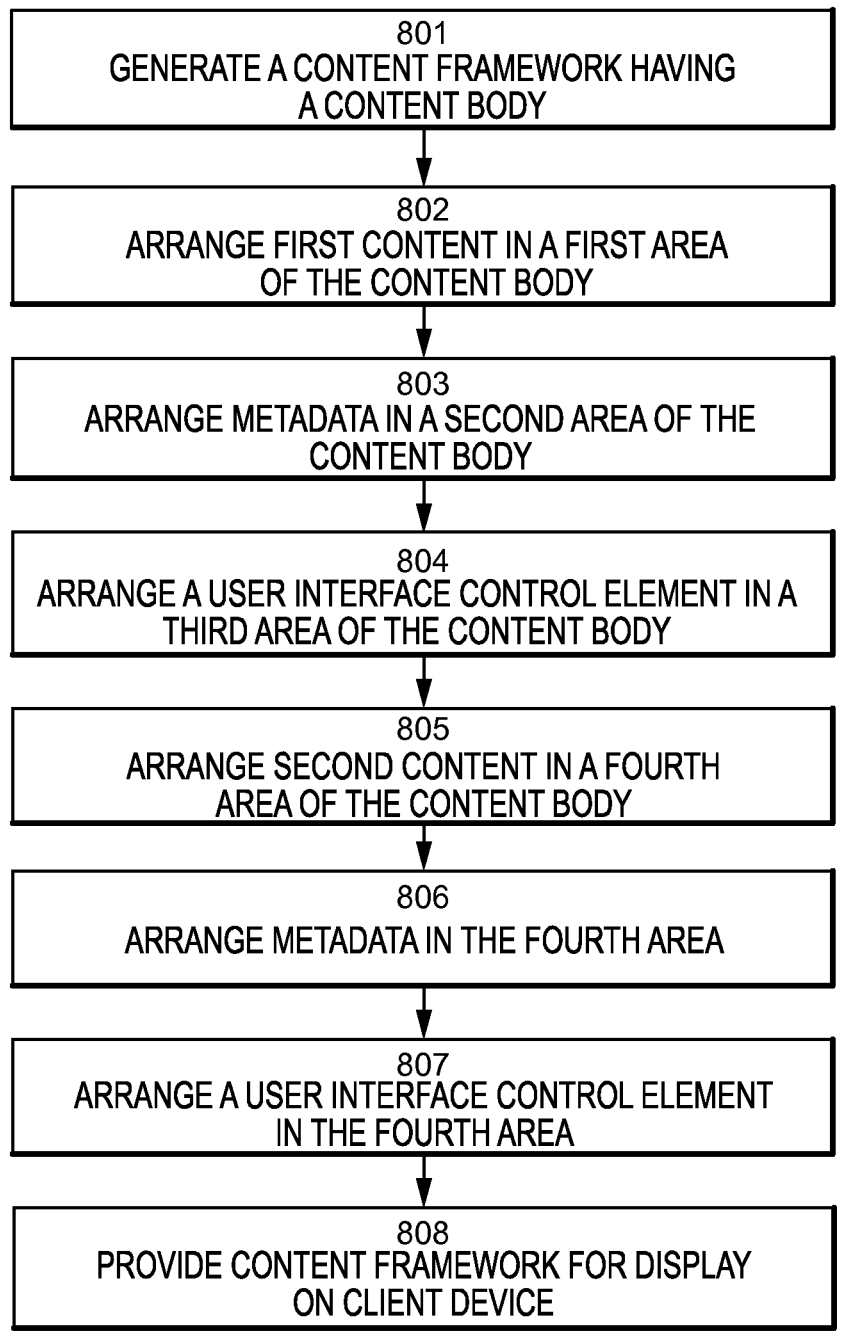
FIG. 8 illustrates an example process for providing a content framework in a social activity stream.

FIG. 8 illustrates an example process 800 using the example server 230 of FIG. 3 for providing a social activity stream content framework. The process 800 begins at step 801 when a content framework is generated by a processor based entity, e.g. a server, a client or a computer system, for example. The content framework includes a content body that provides a defined area within a post for providing content. The content framework may be generated to be consistent in form over a variety of social activity streams, e.g. social networking applications/sites or discussion groups, for example. In addition, the content framework may provide a defined container within the content body for third parties, e.g. advertisers or providers of products or services, to provide shared content to consuming users. Proceeding to step 802, a first content is arranged in a first area of the content body. For example, the first content may include a video, a photograph, a graphic image, a map or a video chat slot. The first content may be arranged to fill the entire content body (e.g., full bleed). Alternatively, the first content may be arranged to fill a portion of the content body. For example, as previously seen in the example shown in FIG. 7, the first content 722 is a picture of a beach in Maui, the picture being arranged in full bleed within the content body 710.

In step 803, metadata associated with the first content is arranged in a second area of the content body. The second area may be a separately defined area from the first area within the content body. Alternatively, the second area may be overlaid on the first area and at least a portion of the second area may be substantially transparent so that the underlying first content is visible. The metadata may be arranged in the form of text that is associated with and/or describes the first content. Alternatively, the metadata may be arranged in the form of a graph, an image, a chart or a table, for example. For example, in the John Doe posted video previously shown in FIG. 6, the second area is arranged as the transparent area 650 that is overlaid on top of the video image, such that the underlying video image is visible through the second area. Also, the metadata 640 is arranged as text that describes what the video is about. Therefore, the consuming user can see the video image posted by John Doe, while simultaneously seeing a description of the video that may help the consuming user decide whether or not to play the video.

In step 804, a user interface control element is arranged in a third area of the content body. The third area may be a separately defined area from the both the first area and the second area within the content body. Alternatively, the third area may be overlaid on either or both of the first area and the second area. At least a portion of the third area may be transparent so that the underlying first content and/or the metadata is visible. The user interface control element may include a button, a link, a pop-up menu or a drop-down menu, for example. A user interface control element may be fully visible, concealed, or any suitable level of transparency or opaqueness. For example, the user interface control element may be a hidden button that is revealed when a cursor is hovered over the button or another portion of the content body. Alternatively, the button may be fully transparent and the button fills in or becomes opaque when a cursor is hovered over the button. Further yet, the button may be fully opaque or the button may be any suitable combination of hidden, transparent and opaque. As previously shown in the example of FIG. 6, the user interface control element 630 is a circular button overlaid on the video image in a third area 616 of the content body 610, where the button has an opaque outer circle and an opaque arrow "play" symbol in the center, with the rest of the button being transparent.

In step 805, a second content is arranged in a fourth area of the content body. The second content may include a video, a photograph, a graphic image, a map or a video chat slot. The second content may be arranged to fill the entire content body (e.g., full bleed) or to fill a portion of the content body. As previously shown in the example of FIG. 7, the second content 724 may be overlaid on the first content 722, e.g. a thumbnail video image or photograph overlaid on a full bleed video image or photograph. The second content may be configured to be arranged in a different manner upon being selected. For example, the second content may be expanded, moved to another area of the content body, or arranged to replace the first content. If the second content is arranged to replace the first content, the first content may further be arranged in the area where the second content was formerly arranged, thereby completing a swap of the first content and the second content. Alternatively, the second content may be arranged next to the first content, e.g. a two videos, two photographs or two video chat slots that are side by side, for example.

Figure 9:
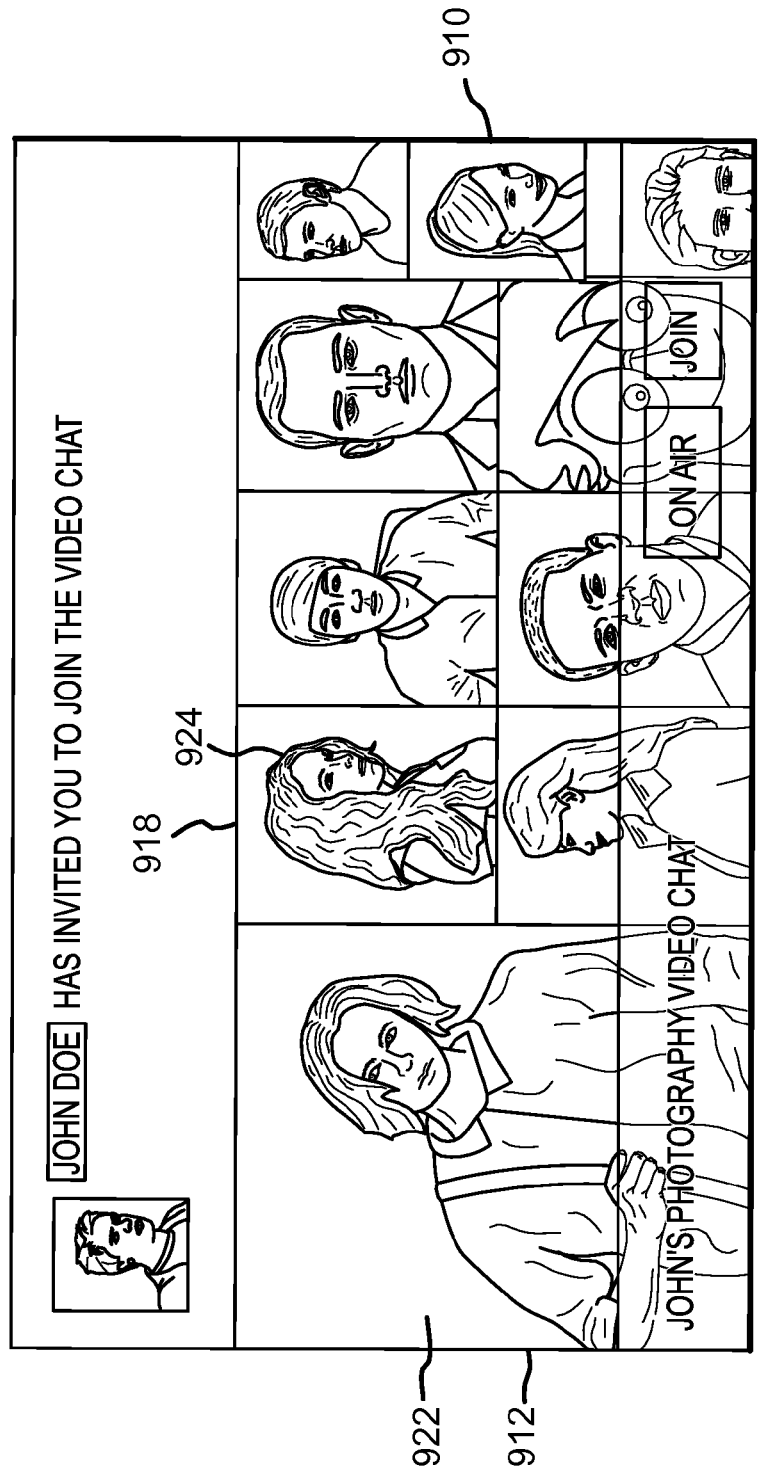
FIG. 9 is an example illustration of still another implementation of a content framework in a social activity stream displayed on a client device.

In a video chat example, as shown in FIG. 9, the first content 922 may be arranged in a first area 912 of the content body 910 as a visual representation of a first user in a video chat session. In addition, the second content 924 may be arranged in a fourth area 918 of the content body 910 as a visual representation of a second user in the video chat session. The visual representation may be a live video image, a thumbnail photograph, a graphic image, a symbol, or text, for example. Further, the visual representation may be arranged such that when a user joins the video chat, a video chat slot is configured to flip over from a static image to a live image of the user. Alternatively, when a user joins the video chat the video representation of the user may be a card that slides in to the area displaying cards of other users on the video chat, for example. The new card may also bump into other cards in a fun and playful manner.

Figure 10:
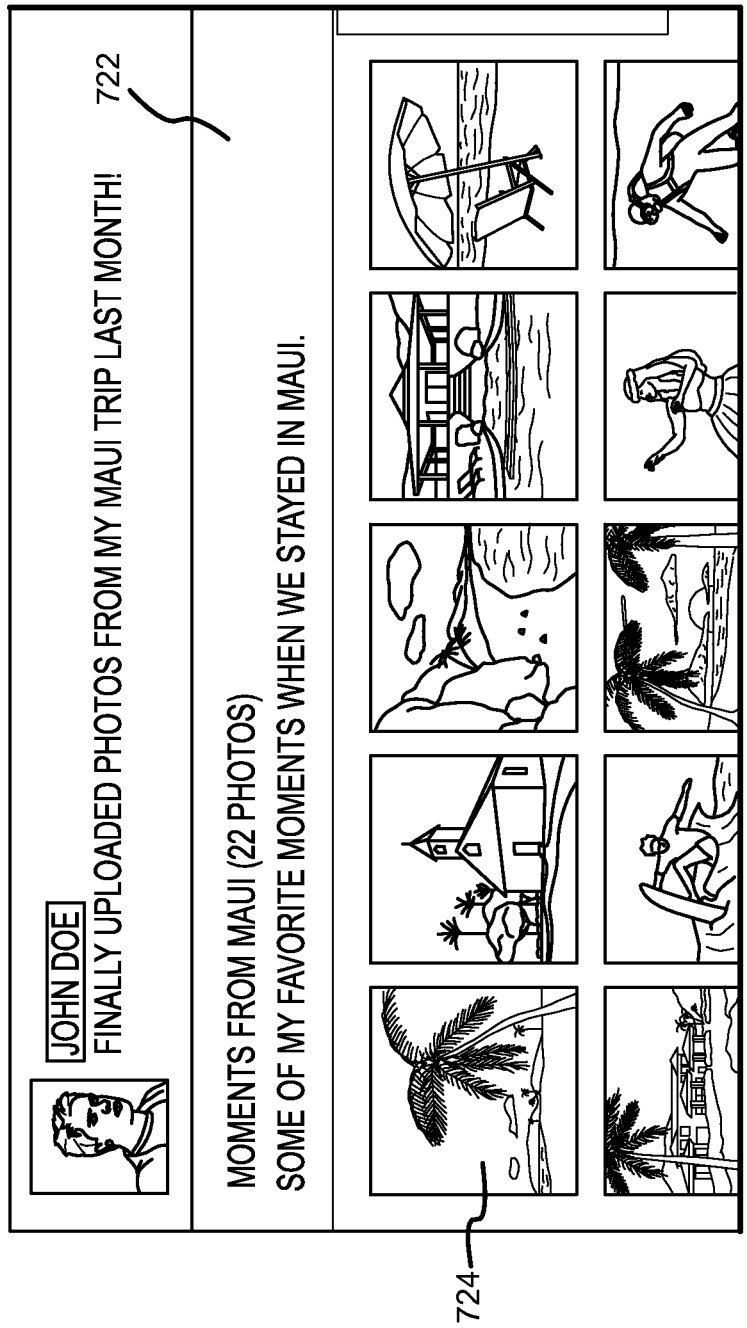
FIG. 10 is an example illustration of another implementation of a content framework in a social activity stream displayed on a client device.

In step 806, metadata associated with the second content is arranged in the fourth area of the content body. The metadata may be arranged to be overlaid on the second content or as hidden metadata that is revealed when a cursor is hovered over the fourth area, for example. Proceeding to step 807, a user interface control element associated with the second content is arranged in the fourth area of the content body. The user interface control element associated with the second content may have any or all of the characteristics previously described for the user interface control element that is associated with the first content. In addition, the second content may be arranged to be partially concealed such that the visible portion of the second content is overlaid on the first content, and the user interface control element may be a hidden button that causes the second content to become fully visible when a cursor is hovered over the hidden button. For example, the first content 722 may be a photograph and the second content 724 may be arranged as a thumbnail photograph in which the top portion of the thumbnail photograph is visible and is overlaid on the photograph (as previously shown in FIG. 7), such that hovering a cursor over the thumbnail photograph causes the thumbnail photograph to move up so that the entire thumbnail photograph is visible (as shown in FIG. 10).

Figure 11:
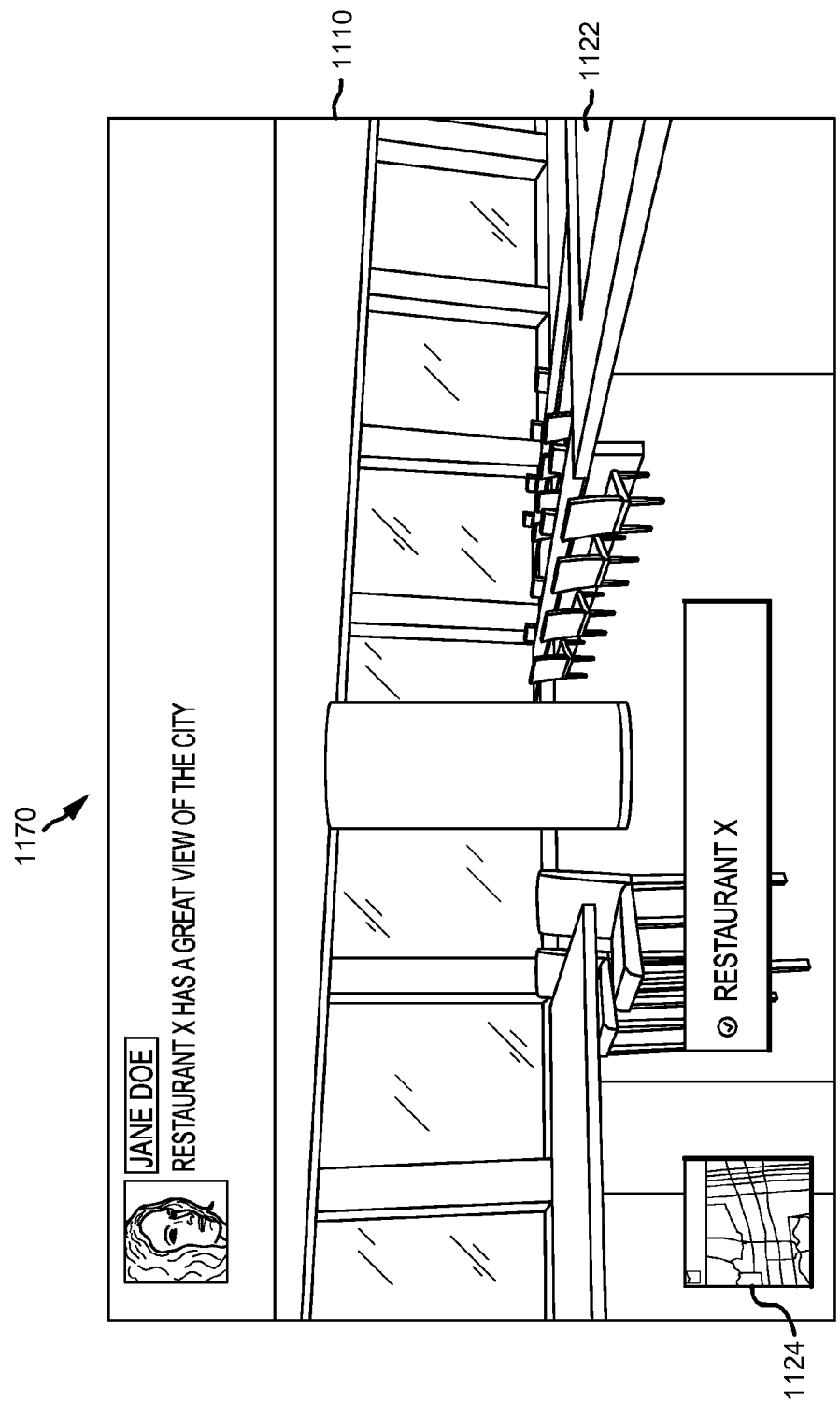
FIG. 11 is an example illustration of yet another implementation of a content framework in a social activity stream displayed on a client device.
Figure 12:
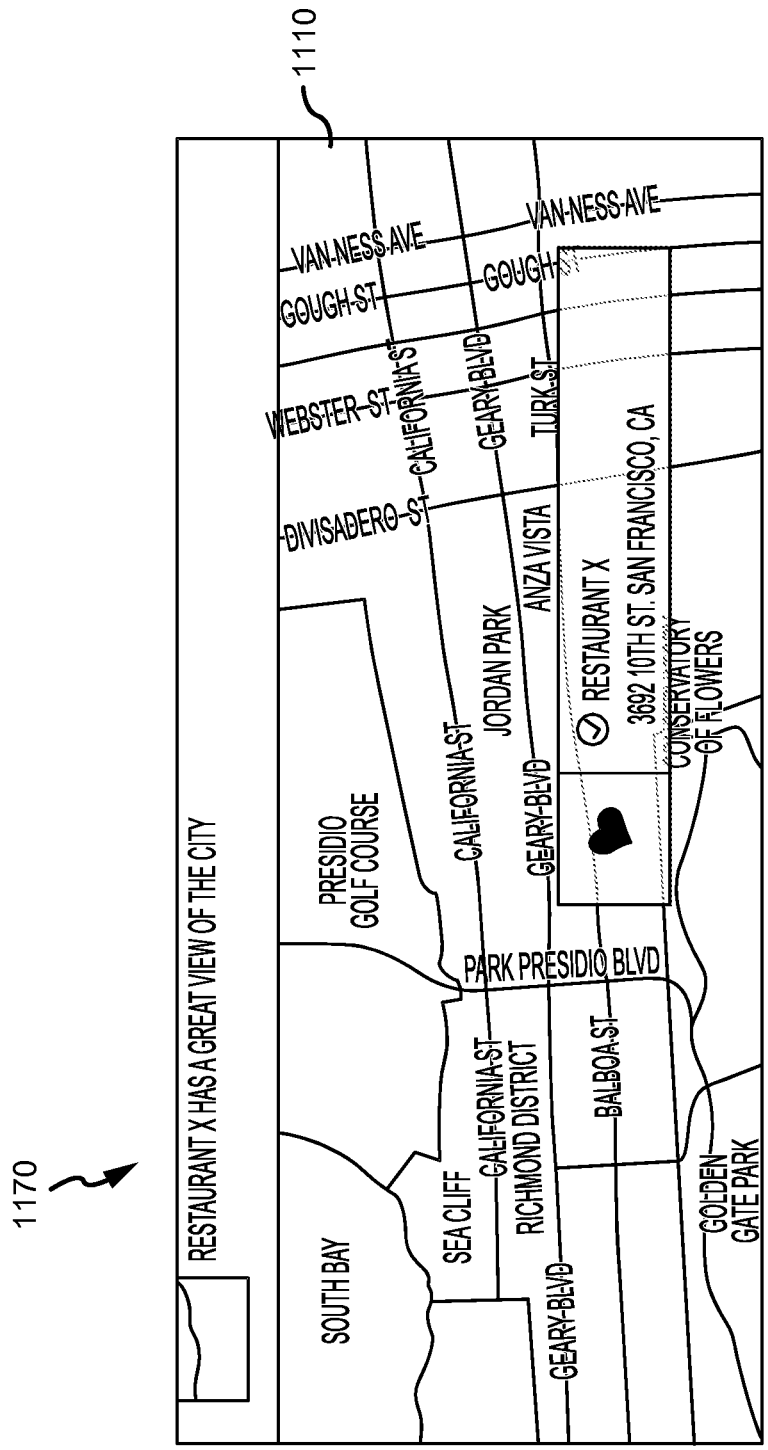
FIG. 12 is an example illustration of still another implementation of a content framework in a social activity stream displayed on a client device.

The example process 600 ends in step 608, in which the content framework with the arranged content body is provided for display in the social activity stream on a client device. The content framework or alternatively, the arranged content body, may be provided as part of a post framework. A consuming user may then view and/or interact with the shared content in the content body without ever having to leave the content body. For example, as shown in the examples of FIGS. 11 and 12, the content body 1110 may have a first content 1122 arranged as a picture of a restaurant in full bleed in the content body 1110, and a second content 1124 arranged as a thumbnail map overlaid on the picture of the restaurant. The consuming user may receive the posting user's post, be interested in the location of the pictured restaurant and click on the thumbnail map, thereby expanding the map to replace the picture of the restaurant and fill the content body 1110 in full bleed, as shown in FIG. 12. The consuming user may also maneuver around the map to obtain directions or to see the restaurant location in reference to other areas on the map. All of these actions may be taken by the consuming user without ever leaving the content body 1110 of the post 1170.

In addition, the content framework may be configured to include an animation as a content. The animation may be arranged with a user interface control element for starting and/or stopping the animation, by either clicking on the user interface control element or hovering over the user interface control element, for example. Also, the user interface control element may be a favicon or link that takes a consuming user to a location external to the post. For example, a picture of a store may be the content arranged in the content body and a favicon of the store may be arranged on the picture, such that when the favicon is selected the consuming user is taken to the website for that store. The content framework may also be configured to provide the content body for display in the form of a card, e.g. a business card for example. The business card form may be further configured to be flipped over when selected by clicking or hovering, thereby revealing additional content and/or metadata and/or user interface control elements.

Each of steps 801 through 808 may be performed by any combination of servers, clients or computer systems. For example, all of steps 801 through 808 may be performed by a single server, or each of the steps may be performed by a different server. Alternatively, any or all of steps 801 through 808 may be performed by the client that is the user's device, or by any combination of the user device client, other clients, servers and computer systems, for example.

An example will now be described using the example process 800 of FIG. 8, and a server 230, a server memory 340, a content framework index 344, a network 250, a smartphone client 210, an output device 314, and a mobile web browser 322 as shown in FIG. 3.

The process 800 begins when it is desired to provide a content framework for use within a social activity stream associated with a social networking application. In step 801, the server 230 generates a content framework and stores the content framework in a content framework index 344 in a server memory 340. In step 802, the server 230 arranges a first music video in full bleed in a first area of a content body. In step 803, the server 230 overlays metadata in the form of text "Check out my current favorites" on the first music video. In step 804, the server 230 arranges a user interface control element in the form of a play button on the first music video The server 230 also arranges a second music video as a thumbnail video overlaid on the first music video, in step 805. In step 806, the server 230 arranges metadata on the second music video thumbnail in the form of text giving the title and the length of time the second music video takes to play. The server 230 also arranges a user interface control element in the form of a hidden select button overlaid on the second music video thumbnail, in step 807. The process ends in step 808, in which the server 230 provides the content framework for display in the social activity stream on the display screen 314 of the consuming user's smartphone 210 after the consuming user uses the web browser 322 to access the social activity stream on the Internet. The posted videos may be public domain videos that are simply being shared by the posting user. Alternatively, the posted videos may be provided by a third party entity that sells music videos and the posting user's post may include a "Buy" button in the content body, such that the consuming user may purchase and download a music video from the content body of the post. The content framework may provide a clearly defined container encompassing all or a portion of the content body for the use of the third party music video seller, thereby controlling the amount of the content framework that the third party may use.

While many examples are provided herein in the context of providing a content framework for a social activity stream, the principles of the present disclosure contemplate other types of content framework features as well. For example, providing a plurality of content items, interchanging different content items, and defining specific parameters for allowing content providers e.g. third party advertisers to interact with the content framework, are all considered within the scope of the present disclosure. As another example, the content may be rich media content and the content may be obtained from an interactive application, a content application or an interactive content provider. In yet another example, each portion of the post framework may have a distinct visual boundary that visually distinguishes that portion of the post framework from other portions of the post framework, such as the head portion having a first distinct visual boundary, the body portion having a second distinct visual boundary, the waist portion having a third distinct visual boundary, the leg portion having a fourth distinct visual boundary and the accessory portion having a fifth distinct visual boundary. Similarly, each area in the content body may have distinct visual boundaries. Further, any portion of the post framework or the content framework may be configured to be expandable, contractable or hideable.

Systems, methods, applications, and machine-readable storage media for providing a post and/or content framework for a social activity stream have been described. While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for providing a social activity stream post, the method comprising:
    generating by a processor a post framework, the post framework comprising a plurality of portions configured as a head portion, a body portion and a waist portion, each portion being visually defined to provide clear separation of the plurality of portions within the post framework, wherein at least one portion is configured to be expandable, contractable or hideable within the social activity stream post;
    arranging identifying information of a posting user in the head portion;
    arranging content in the body portion, wherein the content is user interactive within the social activity stream post;
    arranging a social network control element in the waist portion; and
    providing the post framework for display in the social activity stream on a client device.

2. The computer-implemented method of claim 1, wherein the post framework further comprises a leg portion, and
    wherein the method further comprises arranging a user comment in the leg portion.

3. The computer-implemented method of claim 1, wherein the post framework further comprises an accessory portion, and
    wherein the method further comprises arranging context information of the content in the accessory portion.

4. The computer-implemented method of claim 1, further comprising arranging a user interface control element in the post framework, wherein the user interface control element is configured to change its appearance or to reveal concealed metadata about the post framework when a cursor is hovered over the user interface control element.

5. The computer-implemented method of claim 1, further comprising revealing concealed metadata providing information related to the post framework when a cursor is hovered over any portion of the post framework.

6. The computer-implemented method of claim 1, further comprising:
    creating a defined container area within the body portion; and
    arranging third party content in the defined container.

7. The computer-implemented method of claim 1, wherein the post framework is arranged in a common form for each of a plurality of social activity stream post types.

8. The computer-implemented method of claim 1, wherein the post framework is configured to provide a plurality of posts as a coalesced stack of posts in response to a user action.

9. The computer-implemented method of claim 1, wherein the post framework is configured to be displayed as a card in the social activity stream.

10. The computer-implemented method of claim 9, wherein additional information is arranged to be displayed in response to a user action that is visualized as the card being flipped over.

11. The computer-implemented method of claim 9, wherein a plurality of cards are provided to be displayed as a stack of cards that have been read, wherein each card corresponds to a post in the social activity stream.

12. A system for providing a social activity stream post framework, the system comprising:
    a memory storing executable instructions; and
    a processor configured to execute the executable instructions, causing the system to:
        generate a post framework, the post framework comprising a plurality of portions, each portion being visually defined to provide clear separation of the plurality of portions within the post framework, wherein one portion is a content framework comprising a content body;
        arrange first content in a first area of the content body;
        arrange metadata of the first content in a second area of the content body;
        arrange a user interface control element associated with the first content in a third area of the content body; and
        provide the post framework with the arranged content body for display in a social activity stream on a client device.

13. The system of claim 12, wherein the executable instructions further cause the system to arrange second content in a fourth area of the content body.

14. The system of claim 13, wherein one of the second area, the third area and the fourth area of the content body is overlaid on a portion of the first area of the content body.

15. The system of claim 13, wherein the content framework is configured to arrange the second content in the first area of the content body when the second content is selected at the client device.

16. The system of claim 13, wherein the content framework is configured to arrange the first content in the fourth area of the content body.

17. The system of claim 13, wherein one of the first content and the second content is rich media content in full bleed in the content body, comprising a video, a photograph, a graphic image, a map or a video chat slot.

18. The system of claim 12, wherein the first content is a mosaic of visual representations of people presently participating in a video chat session, wherein the mosaic is configured to dynamically add a new visual representation of a new participant at a time the new participant joins the video chat session and to dynamically delete a current visual representation of a present participant when the present participant leaves the video chat session.

19. The system of claim 13, wherein the first content is a first photograph and the second content is a photo album having at least one additional photograph, wherein the fourth area is configured to show a portion of a number of photographs in the photo album, wherein the fourth area is configured to expand within the first area when selected to show at least one of a larger portion of the number of photographs in the photo album and a greater number of photographs in the photo album.

20. A non-transitory machine-readable storage medium comprising machine-readable instructions for causing a processor to perform operations which provide a social activity stream post framework, the operations comprising:
    generating by a processor a post framework, the post framework comprising a head portion, a waist portion, a leg portion, an accessory portion and a content framework comprising a body portion;

arranging identifying information of a posting user in the head portion;

arranging first content in the body portion;

arranging a social network control element in the waist portion;

arranging a user comment in the leg portion;

arranging context information of the content in the accessory portion;

arranging metadata of the first content in the body portion;

arranging a user interface control element in the post framework; and providing the post framework for display in a social activity stream on a client device, wherein one of the metadata and the user interface are viewable when a cursor is hovered over the post framework.

21. The non-transitory machine-readable storage medium of claim 20, further comprising arranging second content and metadata of the second content in the body portion.

22. The non-transitory machine-readable storage medium of claim 21, wherein the content framework is configured to hide the metadata of the second content until a cursor is hovered over a portion of the body portion.

23. The non-transitory machine-readable storage medium of claim 21, further comprising wherein the content framework is configured to conceal a portion of the second content until a cursor is hovered over a portion of the second content.

24. The non-transitory machine-readable storage medium of claim 20, wherein the body portion is configured to expand when the first content is selected.

25. The non-transitory machine-readable storage medium of claim 24, wherein the first content is a portion of an interactive map in full bleed within a first distinct visual boundary and an expanded portion of the interactive map in full bleed within a second distinct visual boundary.

26. The non-transitory machine-readable storage medium of claim 20, wherein the first content is a post that has been re-shared from another social activity stream.

* * * * *